United States Patent
Hatton et al.

(10) Patent No.: US 11,539,595 B1
(45) Date of Patent: Dec. 27, 2022

(54) TRACKING CLUSTER IDENTITY OVER TIME

(71) Applicant: Amazon Technologies, Inc., Seattle, WA (US)

(72) Inventors: Donagh Edward Hatton, Kildare (IE); Gianluca Grilli, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 16/805,520

(22) Filed: Feb. 28, 2020

(51) Int. Cl.
  *H04L 41/14* (2022.01)
  *H04L 41/0893* (2022.01)
  *H04L 41/06* (2022.01)

(52) U.S. Cl.
  CPC .............. *H04L 41/14* (2013.01); *H04L 41/06* (2013.01); *H04L 41/0893* (2013.01)

(58) Field of Classification Search
  CPC ...... H04L 41/06; H04L 41/0893; H04L 41/14
  See application file for complete search history.

(56) References Cited

U.S. PATENT DOCUMENTS

| | | | |
|---|---|---|---|
| 9,602,614 B1 * | 3/2017 | Shankaran | G06F 12/0806 |
| 2015/0186229 A1 * | 7/2015 | Bortnikov | G06F 11/2041 |
| | | | 714/4.11 |

* cited by examiner

*Primary Examiner* — Gil H. Lee
(74) *Attorney, Agent, or Firm* — Klarquist Sparkman, LLP

(57) ABSTRACT

A real-time stream-based clustering algorithm is disclosed for correlating network impact according to time and space. The clustering algorithm operates at discrete time steps and produces a partitioning of a network graph such that each partition is a cluster. Clusters are tracked at each time step and the partitions can change by disappearing, splitting or merging with others. To track an incident over many clustering time steps, an ID is assigned to and related to previous clusters such that the same ID can propagate between multiple cluster time steps. Thus, a same incident can be tracked over time as its effect traverses the network. Anchor nodes can be assigned to the clusters to establish a relationship between clusters at different time steps.

19 Claims, 10 Drawing Sheets

TRACKING CLUSTER IDENTITY OVER TIME

BACKGROUND

Cluster analysis relates to grouping of objects, such as network devices, that have similar attributes. In one example, network devices that generate alarm conditions can be grouped together. Cluster algorithms can be used to generate independent clusters. Typical cluster models include connectivity models, centroid models, density models, neural models, etc. In the case of computer network devices, incidents from the network devices can result in network devices associated with different groups. However, relationships between the groups are not well-defined and tracked.

DETAILED DESCRIPTION

Clustering algorithms generate clusters based on incidents (e.g., an event or alert), but lack a technique for tracking how an incident impacts the cluster over time. A real-time stream-based clustering algorithm is disclosed for correlating impact in a computer network according to time and space. The clustering algorithm operates at discrete time steps and produces a partitioning of a network graph such that each partition is a cluster. At a next time step, the partitions can change by disappearing, splitting or merging with other clusters. To track an incident over many clustering time steps, an ID is assigned to and related to previous clusters such that the same ID can propagate between multiple cluster time steps. Thus, a same incident can be tracked over time as its effect traverses the network.

In one embodiment, the cluster algorithm uses an anchor node, which is a node in the cluster that has the longest Time-To-Decay (TTD). As explained further below, a decay function can be used to associate time with a frequency of incidents. By computing a difference of a cluster at time t=n with the clusters formed at time t=n-1 (a previous time step), an ID of a cluster can be determined. If there are no former anchor nodes for a cluster, the cluster is considered a new cluster and a unique ID is assigned, such as by using a random number generator. If there is one former anchor node in this cluster, then the same ID is assigned to the cluster as the cluster containing that anchor node in the last iteration or time step. If there are more than one former anchor nodes in a cluster, then two or more clusters are merging and a selection is made between candidate parent IDs. One technique for deciding which ID to assign is to choose the ID which is the oldest. Other techniques can be used, such as selecting the ID associated with the cluster that has the most nodes.

In a particular application, the cluster algorithm can be used in networks containing multiple network devices. The network devices can include routers, switches, load balancers, firewalls, or other devices used for forwarding packet data. Such network devices can generate network events, such as alarms due to congestion, packet loss, port failure, etc. More generically, the network event is a message that corresponds to something of interest on the network that requires potential action. Such network events can be clustered into sets of events that are spatially and/or temporally related. For example, a port failure on one network device can directly cause congestion on a neighbor network device, which, in turn, can cause further congestion on other downstream network devices. Thus, clustering is useful for overall incident management to determine a core cause of an incident. In other applications, the cluster algorithm can be used on nodes that are separate software systems, which can interact through Application Programming Interfaces (APIs).

Figure 1:
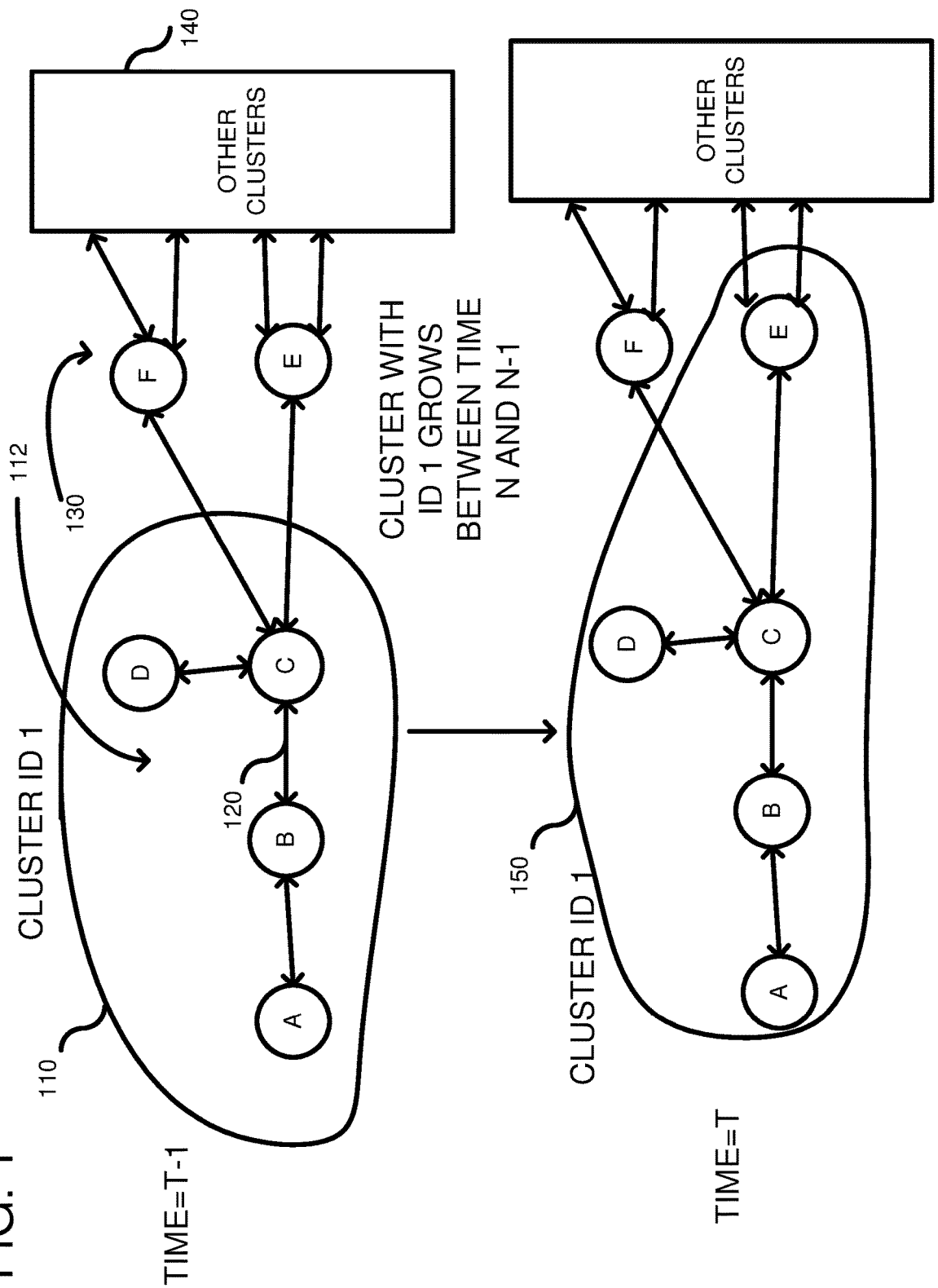
FIG. 1 illustrates a cluster that has an identifier (ID) associated therewith that is tracked between different time points.

FIG. 1 is an illustration of how clusters can be temporally tracked through assignment of an ID. A first cluster 110 including a plurality of nodes 112 is formed using a clustering algorithm at time T-1. There are a variety of clustering algorithms that can be used, such as connectivity-based clustering, centroid-based clustering, distribution-based clustering and density-based clustering. Specific clustering algorithms include the following: K-means clustering, Mean-Shift clustering, Density-Based Spatial Clustering of Applications with Noise (DBSCAN), Expectation-Maximization (EM) Clustering using Gaussian Mixture Models (GMM), Hierarchical Clustering (e.g., top-down or bottom-up), D-stream, etc. Any of these clustering algorithms or others can be used. The clustering algorithms typically receive incident inputs, such as event inputs, from the various nodes to generate the cluster of nodes indicating that the incidents associated with the nodes are related. The cluster 110 includes nodes A, B, C, and D coupled together by links, such as link 120. In one example, the nodes 112 can be network devices and the links can be cables that directly connect the network devices. The nodes 112 are part of a larger group of nodes 130 that can also be formed into separate clusters, shown generically at 140. The cluster 110 can be assigned an ID, shown generically as Cluster ID 1. Some nodes, such as nodes E and F are not included in any cluster. Nodes 112 in the cluster 110 have contiguous links, and a node not having a link to another node in the cluster 110 cannot be included in the cluster. After time T-1, additional incident inputs can be received from any of the nodes. Thus, at a time T, the clustering algorithm can be applied again to the nodes to obtain a cluster 150. Notably, in this example, the cluster 150 is larger (i.e., includes more nodes) than the cluster 110. Specifically, cluster 150 includes all of the nodes 112 of cluster 110, but also includes node E. An algorithm can be used to determine whether the cluster 150 is related to cluster 110. For example, if a same incident that caused nodes 112 to be grouped together caused a similar incident on node E, then the cluster of nodes 110 is related to the cluster of nodes 150. Accordingly, the algorithm can assign the same cluster ID 1 to the cluster 150. Thus, the cluster ID 1 is carried across two different time periods wherein different clusters are determined having a different numbers of nodes. However, a relationship between the clusters computed at different points of time can be analyzed and a relationship is formed wherein the clusters 110, 150 are the same cluster changing over time. The relationship can be established based on a number of factors including having a same anchor node (described below), having a threshold number of the same nodes, etc. Although only two time periods are shown, the cluster ID 1 can be carried through any number of time periods. A high-level algorithm can be as follows: incoming incidents are inserted into micro clusters, which can be modelled as vertices in a graph. For example, a network can be modelled as a graph and the dimensions as labeled edges, and the graph can be traversed to discover spatially proximate entities. The densities of individual vertices can be computed. For example, an exponential decay rule can be used to determine density. The decay rule can be based on a frequency of incidents that occur or other factors, such as classes or types of events. For example, different types of alerts can receive different weighting to the decay function (e.g., a port malfunction can receive more weight than a checksum error). Additionally, the decay rule can be impacted by a class of the node, such as a type of hardware or network entity (e.g., a router can receive a different weighting than a firewall). At periodic intervals, a cluster algorithm can be executed to determine clusters. During this execution, the current density of each vertex is recomputed to accommodate decay and the topology graph is traversed. A node can be included in the cluster if its density is greater than a threshold density. Finally, cluster identification is assigned and persisted.

Figure 2:
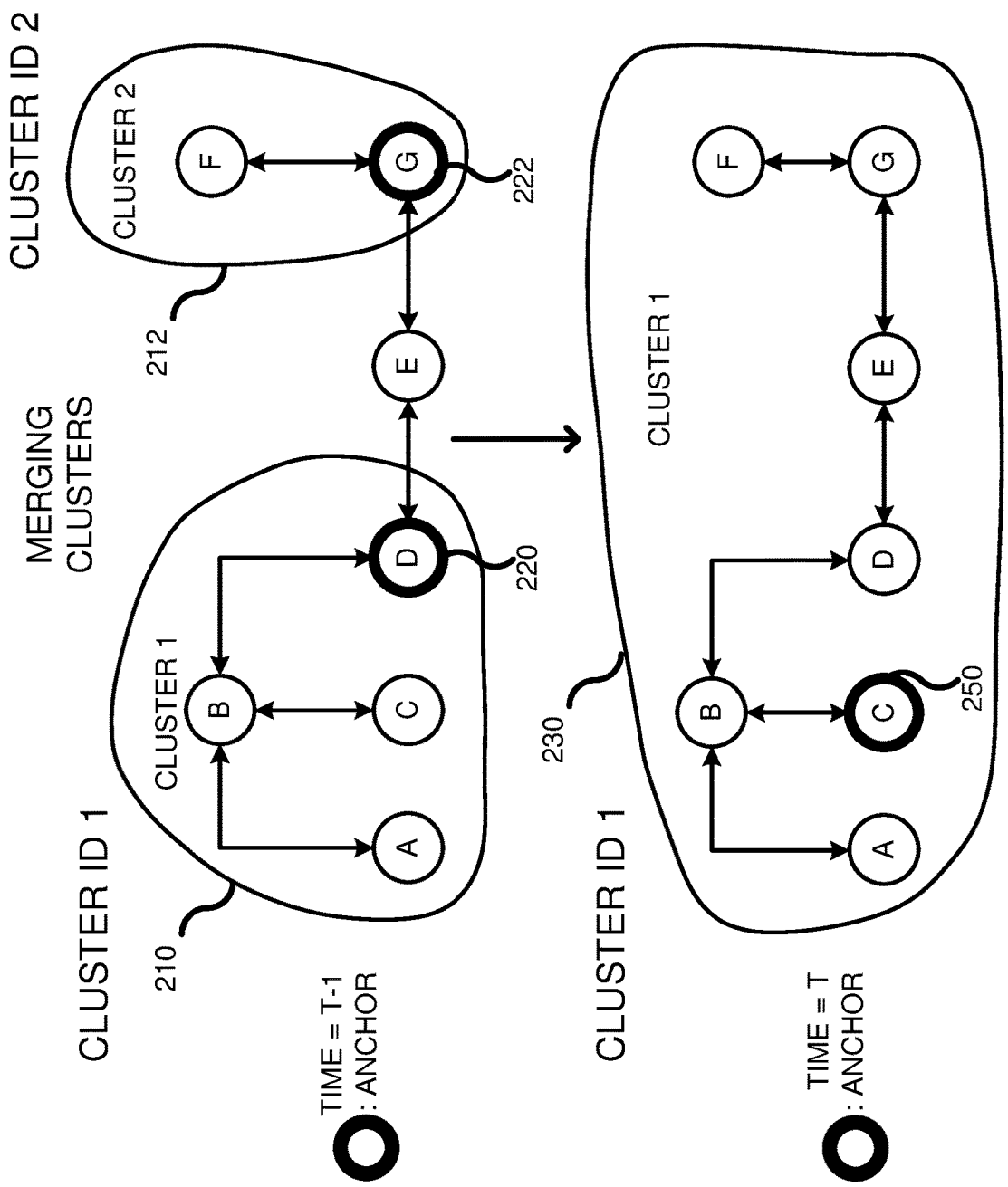
FIG. 2 illustrates clusters with different IDs merging into a single cluster.

FIG. 2 illustrates cluster merging using an anchor node. At a first point in time, T-1, clusters 210 and 212 are formed. Cluster 210 includes nodes A, B, C, and D, while cluster 212 includes nodes G and F. Each cluster is assigned a unique identifier. For example, cluster 210 is assigned cluster ID 1 and cluster 212 is assigned cluster ID 2. Additionally, an anchor node 220 is selected for cluster 210. The anchor node 220 can be selected using a variety of techniques, such as the node with the slowest decay (which is related to a frequency at which incidents occur) or the oldest node. Other techniques can be used, such as using weighting on parts of a graph to select the anchor node. Similarly, an anchor node 222 is selected for cluster 212. At a second point in time, T, a cluster 230 is determined using the clustering algorithm. In this case, the nodes represent a merger between the two clusters 210, 212 plus the addition of node E. A determination is made which ID persists to the new cluster 230. To make this determination, a check can be made to determine which ID is the oldest, which anchor node 220, 222 is the oldest, or which anchor node 220, 222 has the slowest decay. In the case of network devices, the anchor node can be selected based upon the highest frequency of alerts received. Other techniques can be used. In any event, it can be determined that the cluster 230 obtains the identifier of cluster 210 based upon the properties (e.g., oldest, slowest decay, etc.) of the anchor node 220. In the illustrated case, cluster ID 1 is persisted across the different time periods due to the properties of the anchor node 220. A new anchor node 250 is also calculated for the cluster 230. The anchor node 250 for the cluster ID 1 can change over time as the properties of the nodes change. For example, at time T, node C 250 can take a longer time to decay than node D and is, therefore, selected as the anchor node. Notably, at time T-1, node D had a longer time to decay than node C. The recalculation of the anchor node can ensure that all other nodes in the cluster decay before the anchor node so that the anchor node is the last node in the cluster as the number of incidents decrease.

Figure 3:
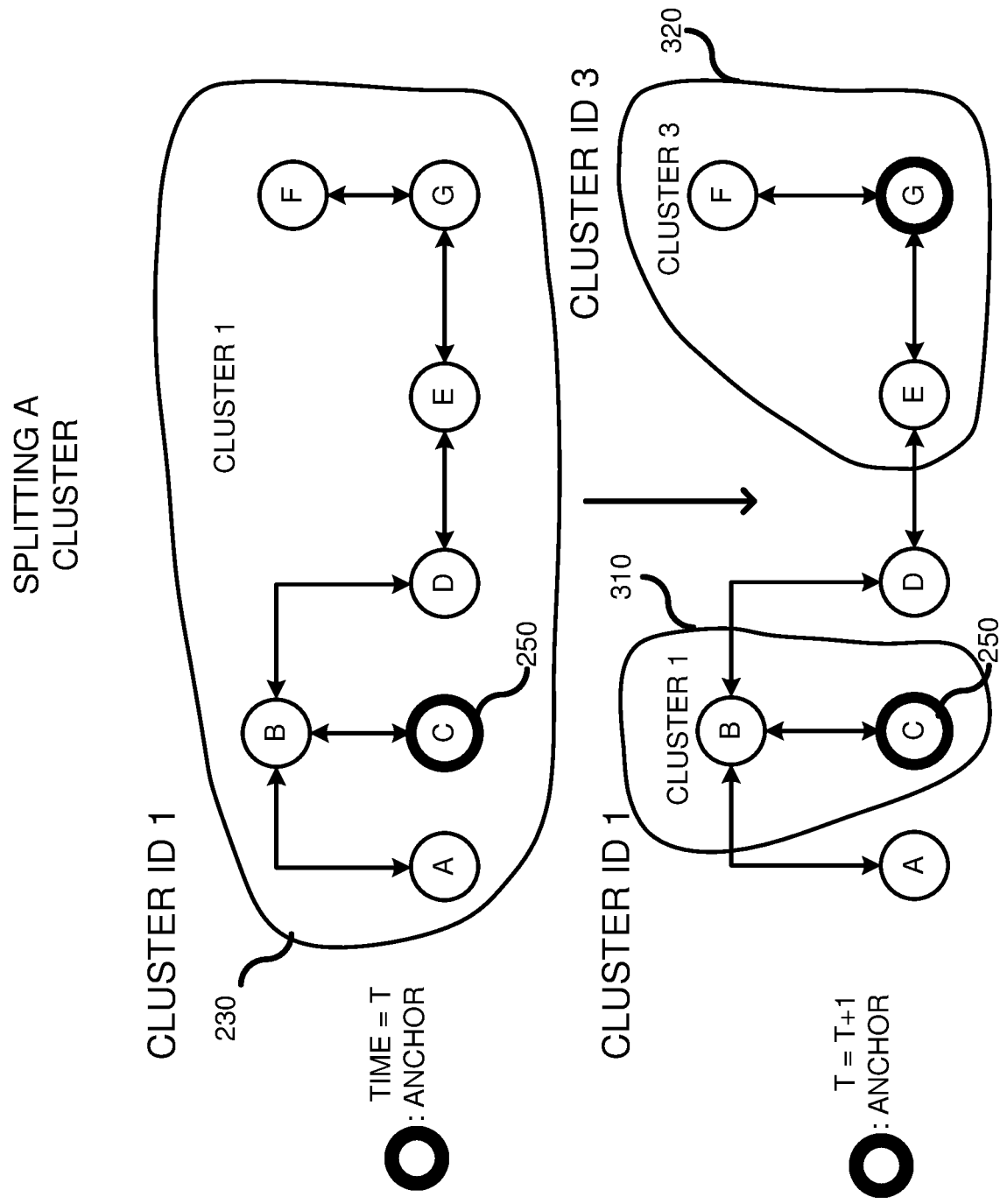
FIG. 3 illustrates a cluster splitting into different clusters while maintaining a cluster ID.

FIG. 3 illustrates cluster splitting using an anchor node and is a temporal continuation of FIG. 2. The cluster 230 from FIG. 2 is shown having the anchor node 250 and is now split at time T+1 into two clusters 310, 320. Because the anchor node C 250 is also in cluster 310, the cluster ID 1 is assigned to cluster 310. The new cluster 320 does not include an anchor node from cluster 230, so it is assigned a new cluster ID 3. The anchor nodes are recalculated for both clusters 310, 320 as each has its own independent anchor nodes. Thus, a cluster 230 can be split into multiple clusters and the cluster ID maintained through the cluster splitting.

The following procedure can be used to maintain anchor nodes through merges and splits:
for each cluster:
if num_former_anchor_nodes==1:
id<-anchor_node_id
else if num_former_anchor_nodes==0:
id<-new_id
else if num_former_anchor_nodes>0:
id<-max(time_to_decay(anchor_nodes)

Figure 4:
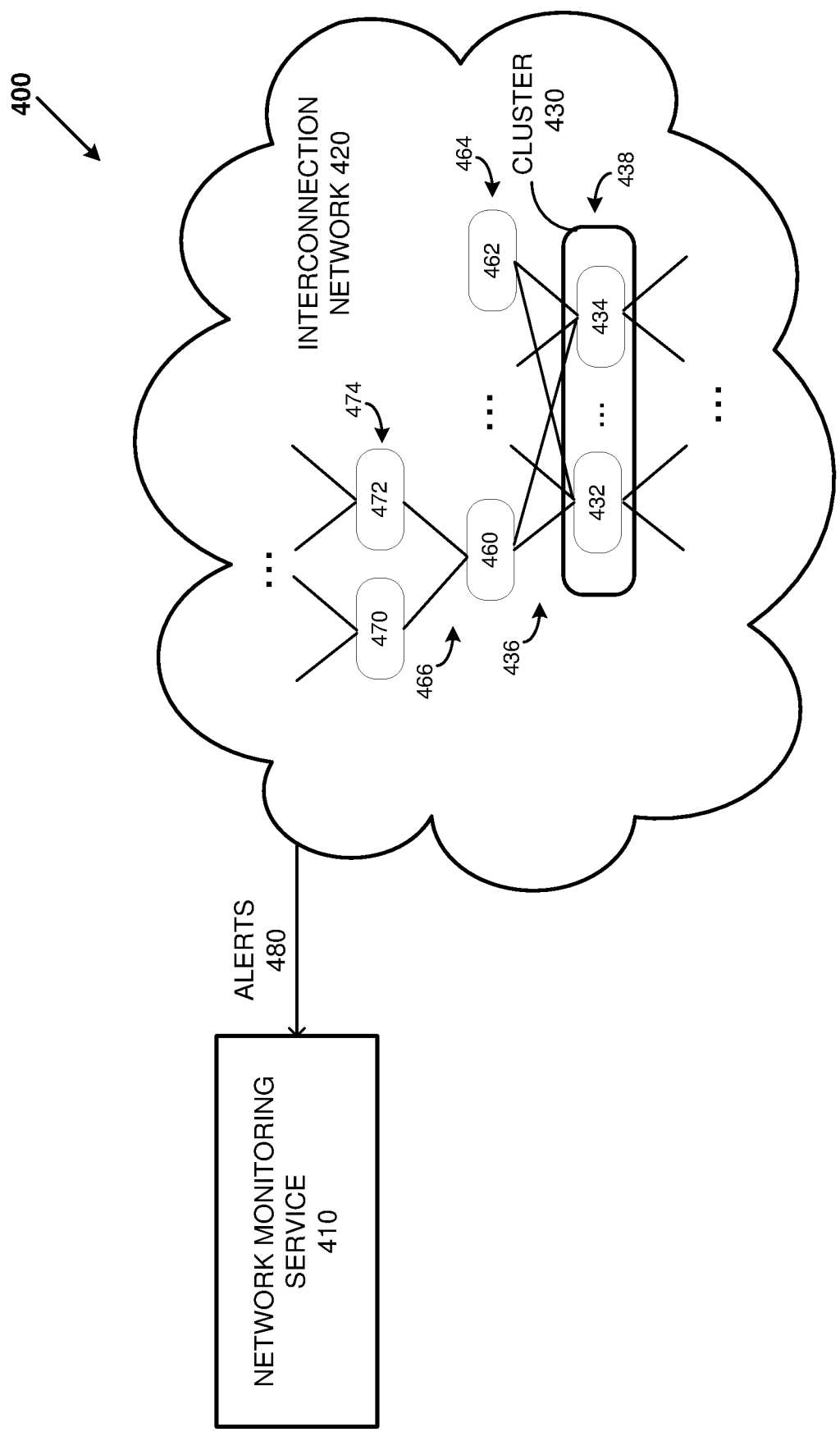
FIG. 4 is an embodiment of a network including a plurality of network devices with a network monitoring service receiving alerts from the network devices to determine clusters.

FIG. 4 is an example of how the clustering described herein can be applied to network devices. Large computer systems can include many compute resources connected by an internal communications network. Computer networks generally comprise various interconnected computing devices that can communicate with each other via packets to exchange data. When small numbers of devices are interconnected, the devices can be directly connected to each other. For example, one device can be directly connected to another device via a network link and the devices can communicate by sending packets to one another over the network link. However, direct connections between large numbers of devices is generally not scalable. Thus, the connections between large numbers of devices are typically via indirect connections. For example, one device can be connected to another device via an interconnection network comprising one or more routers. Large routers for connecting many devices together can be expensive. However, large routers can be constructed from lower cost commodity equipment interconnected as a network fabric. A network fabric can include multiple nodes interconnected by multiple network links. A node can include a network device that can originate, transmit, receive, forward, and/or consume information within the network. For example, a node can be a router, a switch, a bridge, an endpoint, or a host computer. The network fabric can be architected or organized in various ways which can be described by a topology of the network. Specifically, the topology of the network can describe the connectivity of the nodes and links of the communication system. As one example, the network fabric can be organized as a hierarchy of interconnected components. In particular, the network devices can be organized by rows or tiers. The network devices within a tier are generally not directly connected to each other, and the network devices within a given tier can be fully or partially connected to a neighboring tier. Thus, the different devices within a tier can provide redundant connections to a neighboring tier to potentially increase bandwidth and/or availability between the tiers.

The system 400 can include a network monitoring service 410 and an interconnection network 420. The network monitoring service 410 can include software and/or hardware executing on one or more host server computers in communication with the interconnection network 420. The network monitoring service 410 can be a network-accessible service, such as web services. Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request interfaces, along with a definition of the structure of the messages used to invoke the API and the response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request. Additionally or alternatively, the web service can perform actions in response to the API request without generating a response to the endpoint identified in the request.

The interconnection network 420 can be configured to transmit packets using one or more communications protocols. Routing through the interconnection network 420 can be based on addresses associated with one or more layers of the Open Systems Interconnection (OSI) model. The OSI model standardizes and partitions the internal functions of a communication system into abstraction layers. For example, the interconnection network 420 can be configured to communicate using User Datagram Protocol (UDP) packets (layer 4, the transport layer, of the OSI model) over Internet Protocol (IP) (layer 3, the network layer, of the OSI model) over Ethernet (layer 2, the data link layer, of the OSI model). In an alternative embodiment, the interconnection network 420 can be configured to communicate with Infiniband, Fibre Channel, RapidIO, or another communications protocol.

The interconnection network 420 can include multiple network devices (such as devices 432, 434, 460, 462, 470, and 472). Network devices can include switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points, for example. The network devices can be organized in an architecture or fabric that can be described by a topology of the network. The topology of the network can describe any relationships and/or interconnections among the different network devices. For example, the network devices can be grouped into clusters, such as the cluster 430. As a specific example, the cluster 430 includes the network devices 432 and 434. The interconnection network 420 can be used to route network traffic among the different nodes of the interconnection network 420.

The network monitoring service 410 can be used to receive alerts 480. Additionally, the network monitoring service 410 can receive and/or generate a network topology of the interconnection network 420 so that the interconnection network 420 can be modelled. Using the topology information and the alerts, the network monitoring service can determine the clusters, such as cluster 430, and assign IDs to the clusters so that the clusters change over time and can be tracked and modelled for incident behavior.

Figure 5:
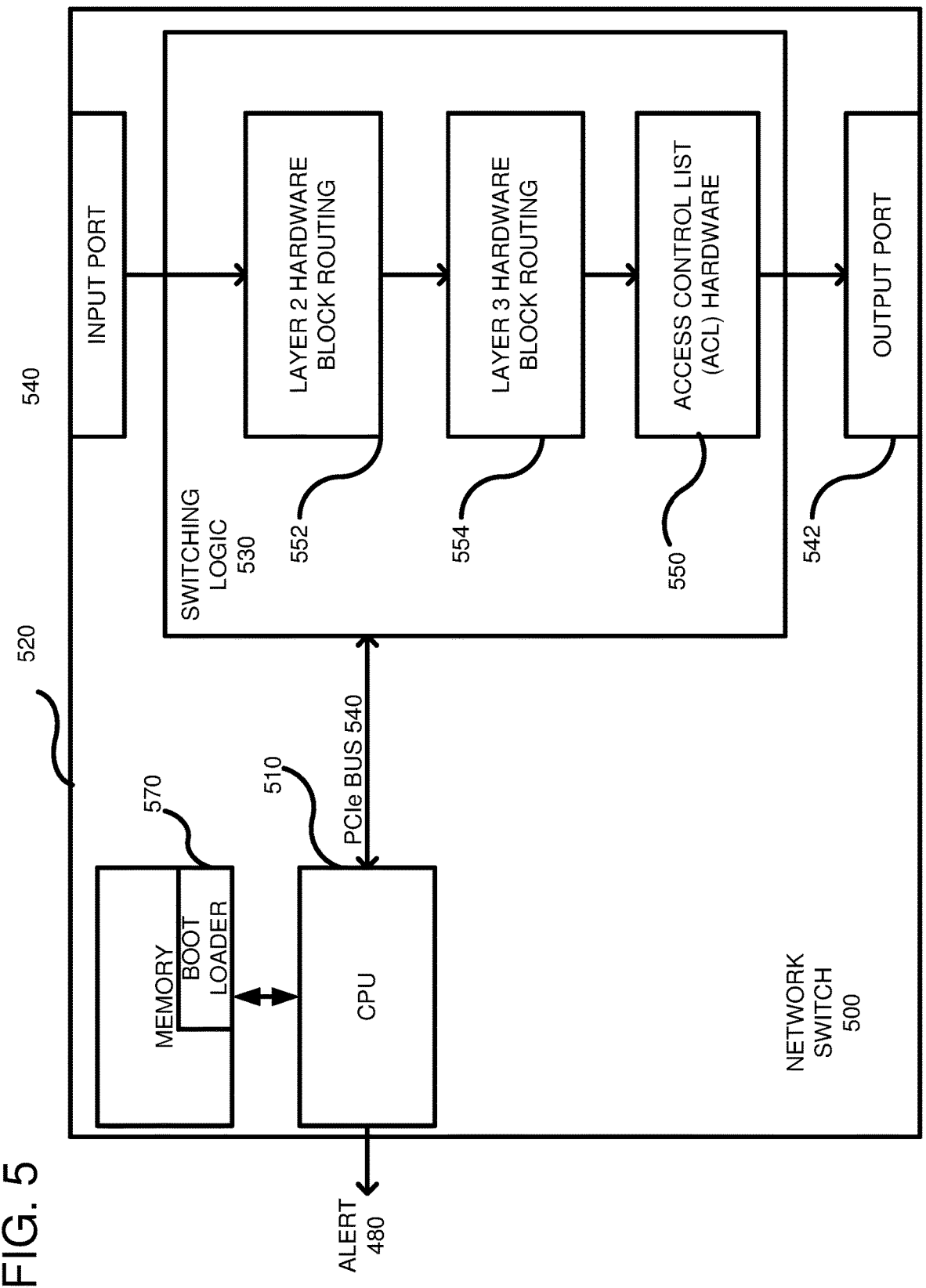
FIG. 5 is an embodiment of a network device.

FIG. 5 shows a detailed example of an embodiment of a network switch 500. In this embodiment, a CPU 510 is coupled to a memory 520 and to switching logic 530 through a PCIe bus 540 (other protocols and bus types can be used). The switching logic 530 is positioned between an input port 540 and an output port 542, which are typically adapted to receive network cables, such as Ethernet cables. The switching logic 530 can be a single ASIC integrated circuit or divided into multiple integrated circuits. The switching logic 530 can include multiple different hardware logic blocks including a Layer 2 hardware block 552, a Layer 3 hardware block 554, and an Access Control List (ACL) hardware block 550. The layer 2 hardware block 552 relates to an Ethernet layer and can forward packets based on MAC tables. The layer 3 hardware block 554 relates to forwarding based on a longest prefix match of an IP address. The ACL block 550 relates to permissions and can include rules whether to drop packets. The different hardware blocks can be in a pipeline and additional hardware blocks can be added based on the design.

The CPU can use a boot loader 570 stored in the memory 520 to configure any of the hardware blocks 550, 552, 554 upon startup of the CPU, such as by powering on, resetting, or otherwise. The boot loader 570 can be designed to configure any of these hardware logic blocks by programming registers, memory locations, or other hardware within the blocks. The programming can include programming of the logic to control packet routing, such as MAC tables associated with the layer 2 hardware logic block, security rules associated with the ACL logic, etc. Packets then pass from the input port 540 to the output port in accordance with the configuration of the hardware logic blocks 550, 552, 554 in the pipeline. If the CPU detects any errors, it can issue an alert, such as alert 480, which can be received by the network monitoring service 410 (FIG. 4).

Figure 6:
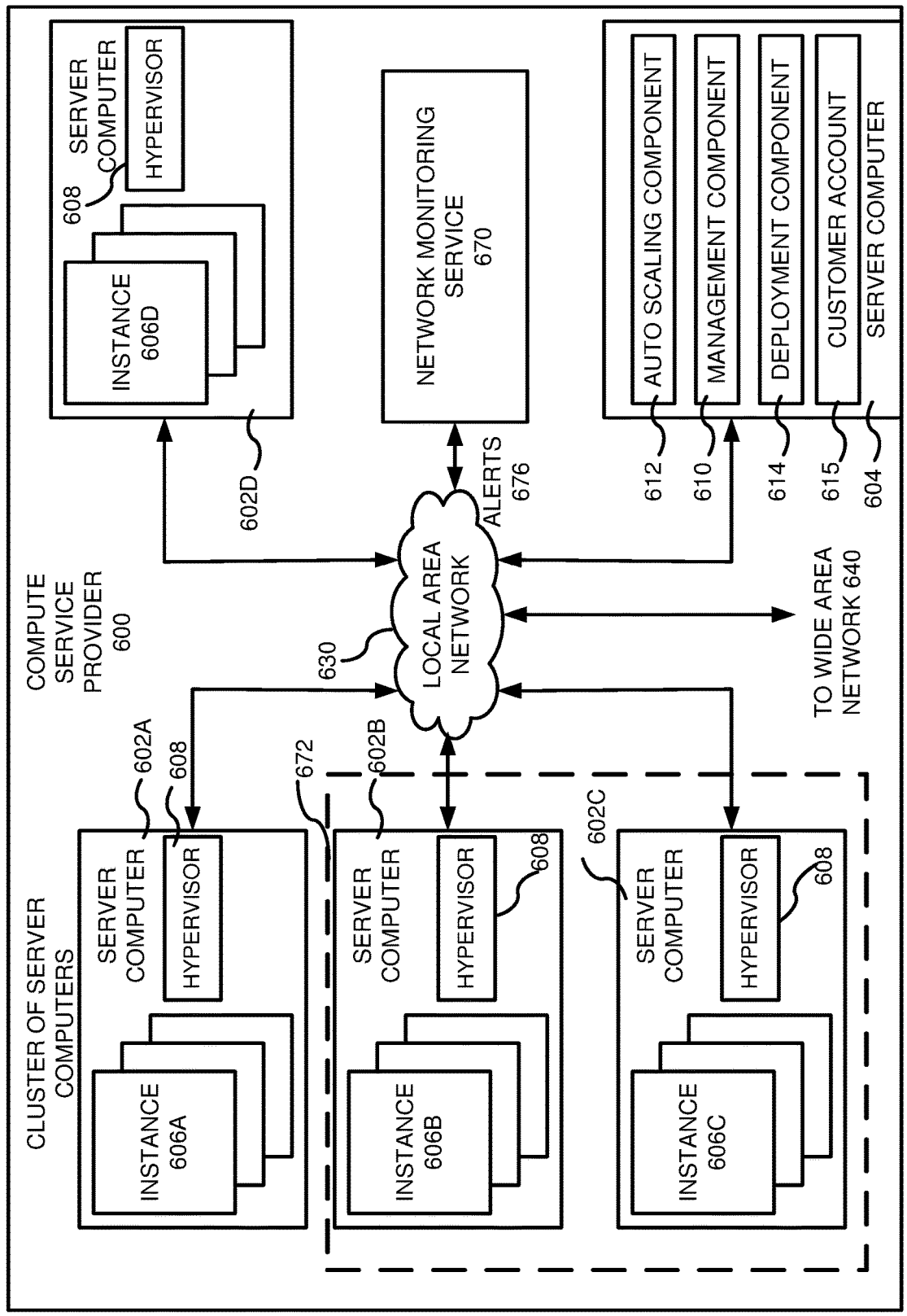
FIG. 6 is an embodiment of a compute service provider including a cluster of server computers as determined by a network monitoring service.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

A network monitoring service 670 can be used to identify clusters of server computers, such as cluster 672 (shown in dashed lines), based upon alerts 676 received from the server computers 602A-602D. The network monitoring service 670 can then use the alerts 676 and known topology of the compute service provider 600 to generate clusters. As previously explained, the clusters can have an ID associated therewith that can be tracked through different time periods to track how clusters change over time. Thus, the clustering algorithm can be used on different types of nodes, including storage devices, network devices, host server computers, etc.

Figure 7:
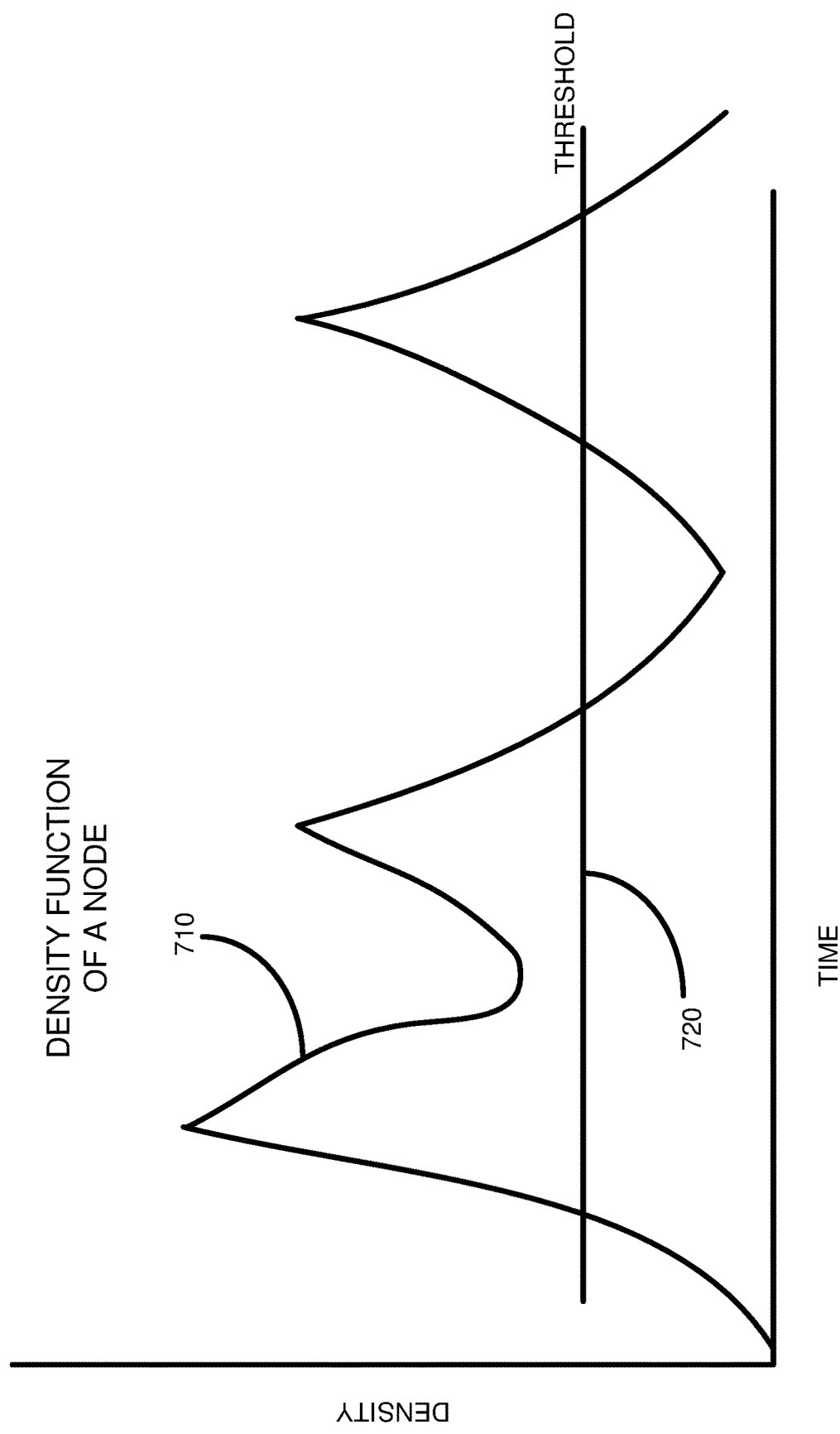
FIG. 7 shows an embodiment of events verses time for a node in a cluster.

FIG. 7 illustrates a density function of a node at 710 wherein a number of incidents, such as alerts, creates peaks while a lack of incidents causes an exponential decay according to the following formula:

$$D(c,t_n)=\lambda^{t_n-t_{n-1}}D(c,t_{n-1})+1$$

Wherein c is a cluster, $t_n$ is a time of arrival of the new entity/alarm, $t_{n-1}$ is a time of arrival of the previous entity/alarm, $\lambda$ is a decay factor, and D is the density.

Suppose a cluster c receives a new alert/event at time $t_n$, and suppose the time when c received the previous alert/event is $t_{n-1}$, with $t_n > t_{n-1}$, then the new density of the cluster c can be updated using the formula above.

A determination can be made whether the density function 710 exceeds a density threshold 720. If so, then the node is a candidate for grouping in a cluster. If other candidate nodes are linked together, then such nodes can form a cluster. Linked nodes can relate to properties that can be described by edges in a topology graph, or by physical network connections. Furthermore, links can be physical (layer1/layer2 in the OSI model), logical via protocol (layer3 in the OSI model ip to ip) or virtual as in the abstract notion of "shared failure domains" where a failure in one device can manifest symptoms in another device despite no obvious physical/logical connection between them. For example, in the case of border routers a failure in one may result in an increase in congestion on others due to traffic shaping. The nodes representing these routers may be linked in a topology regardless of physical proximity.

The density function 710 can also be used for a determination of an anchor node by comparing all nodes in a cluster and selecting the node with the highest density function at a current point in time. Thus, the anchor node can be chosen such that it is a node that has a density function 710 above the threshold 720 longer than the other nodes in the cluster assuming no new incidents are received. In one embodiment, if a new single entity/alarm joins an existing cluster, then the new cluster density is a function of the old cluster density, but decayed according to an exponential function, plus one.

The above formula can be more generalized as follows:

$$D(c,t_n)=\lambda^{t_n-t_{n-1}}D(c,t_{n-1})+\alpha$$

Wherein alpha is a number of alerts/events.

Figure 8:
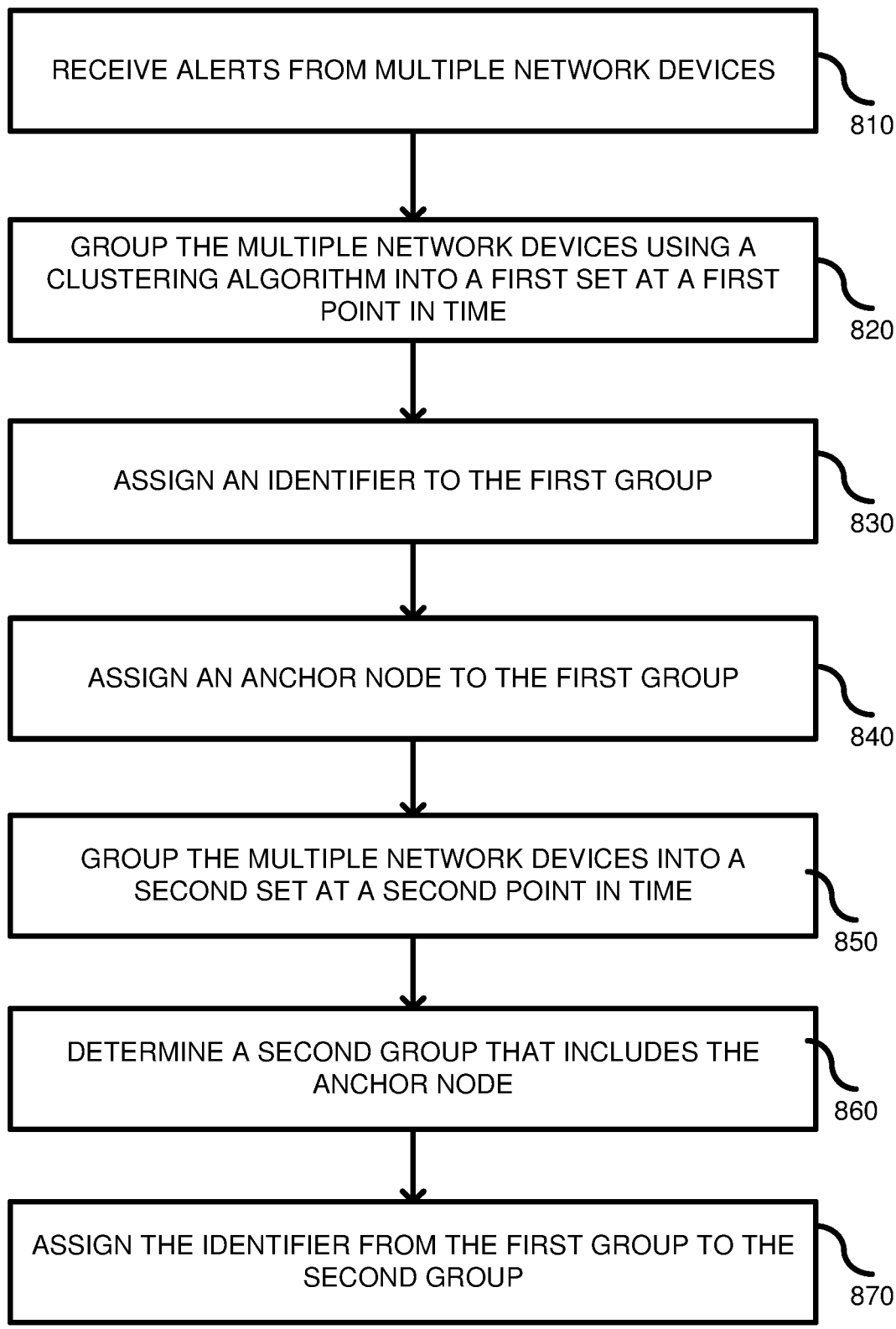
FIG. 8 is an embodiment of a flowchart for tracking cluster identity over time.

FIG. 8 is a flowchart of a method for tracking clusters of events for network devices. In process block 810, alerts are received from multiple network devices. For example, in FIG. 4, the network monitoring service 410 can receive alerts 480 from the network devices, such as network devices 432 and 434. In process block 820, the multiple network devices are grouped using a clustering algorithm into a first set at a first point in time. For example, in FIG. 1, assuming the nodes 112 are network devices, they are grouped into the cluster 110, which is a first set of nodes at a time T-1. In process block 830, an identifier is assigned to the group. For example, in FIG. 1, the identifier is shown as Cluster ID1. This ID can be an alphanumeric value or any value that uniquely identifies the cluster with respect to other clusters. In process block 840, an anchor node is assigned to the first group. For example, in FIG. 2, the anchor node 220 is assigned to the cluster 210. The decision on which node should be the anchor node can be made using the density function of FIG. 7, such as the node having a current highest density. Thus, in the case of network devices, the anchor node can be selected based on a number of the received alerts. In process block 850, multiple network devices are grouped together into a second set at a second point in time. For example, in FIG. 1 at time T, a clustering algorithm can be used again to analyze the nodes, independent of the results at time T-1, and generate a new cluster 150. The new cluster can be based on whether the density of each of the nodes exceeds a threshold, as is shown in FIG. 7, and whether the nodes are linked. In process block 860, a determination is made whether the second group includes the anchor node from the first group. For example, in FIG. 2, a determination can be made whether the cluster 230 includes the node D, which is the anchor node 220 in the cluster 210 at time T-1. At process block 870, the same identifier from the first group is assigned to the second group. For example, in FIG. 2, the cluster ID 1 is assigned to the second group 230, which is the same ID as group 210 at T-1. Such an assignment is made because the anchor node from the previous group 210 is in the second group 230. If the anchor node is not present in the second group, then no relationship exists between the clusters and a new ID is given to the cluster 230. Thus, the cluster ID 1 is persisted between independently computed clusters using the anchor node as a basis of consistency between the groups.

Figure 9:
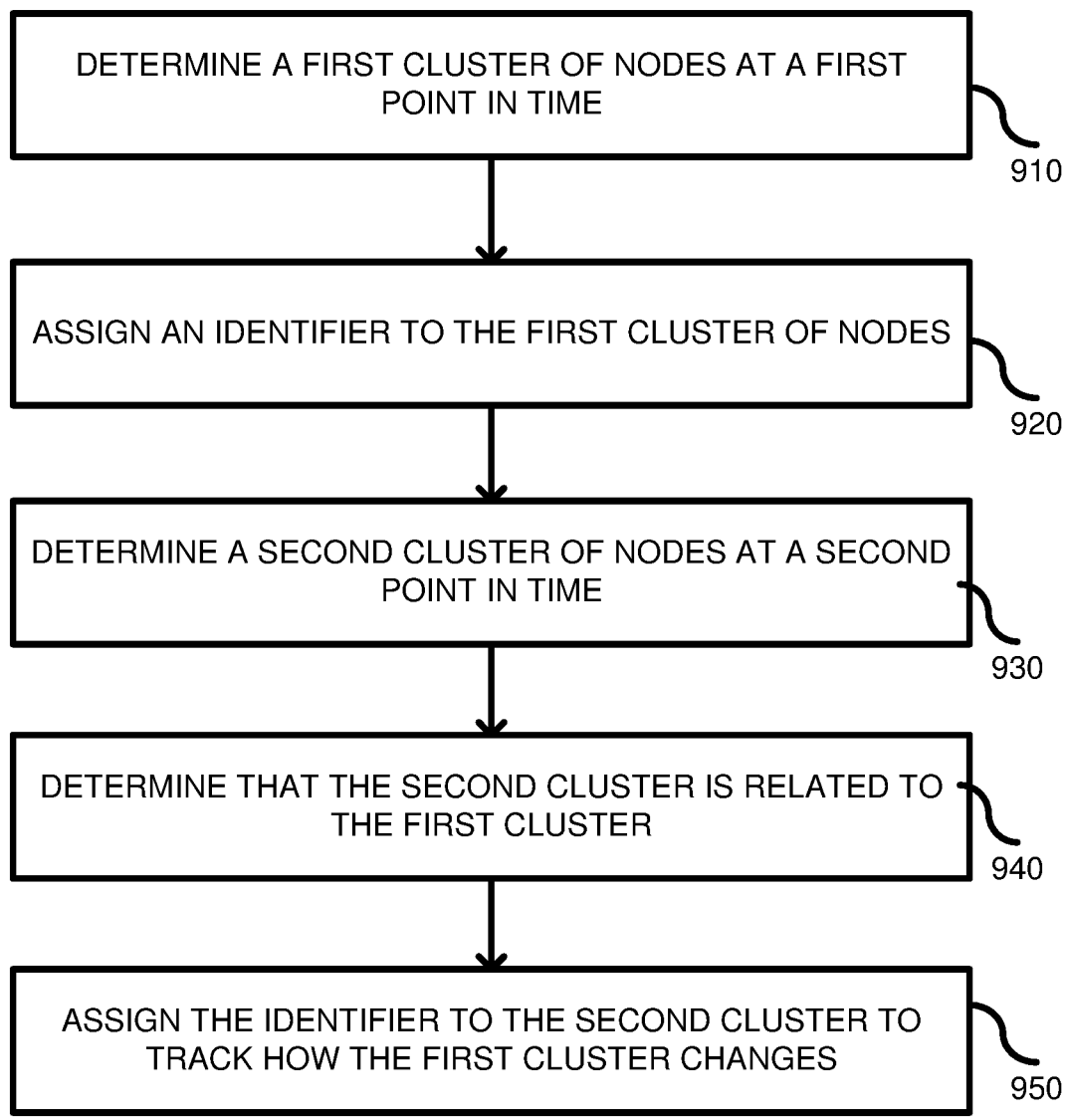
FIG. 9 is another embodiment of a flowchart for tracking cluster identity over time.

FIG. 9 is a flowchart according to another embodiment of a method for tracking cluster identity over time. In process block 910, a first cluster of nodes is determined at a first point in time. For example, in FIG. 1, a first cluster of nodes 110 is determined at a time T-1. The cluster can be chosen based on nodes that satisfied predetermined criteria, such as nodes that exceed a predetermined threshold of a density function, which can be related to a number of alerts, a frequency of incidents, etc. A clustering algorithm can then be used to make the determination of which nodes are included in a group and can then generate the group. In process block 920, an identifier is assigned to the first cluster of nodes. In FIG. 1, the Cluster ID 1 is assigned to the nodes 110. In process block 930, a second cluster of nodes is determined at a second point in time. In FIG. 1, the second cluster of nodes 150 can be determined using the same clustering algorithm that determined cluster 110. The determination can be made using a state of the density function (FIG. 7) for each node at the time T. Nodes that exceed a threshold density level can be included in the cluster. As shown in FIG. 1, a size of the cluster (the number of nodes in the cluster) can change between time T-1 and T. In process block 940, a determination can be made that the second cluster is related to the first cluster. Such a determination can be made by identifying whether an anchor node from a first group is present in the second group. Other relationships can also be used. For example, if a threshold percentage of nodes in the second cluster is the same as the first cluster, then the clusters can be considered related. Other determinations of relationships between the clusters can also be used. In process block 950, the identifier is assigned to the second cluster to track how the first cluster changes. Thus, the identifier persists over different time steps.

Figure 10:
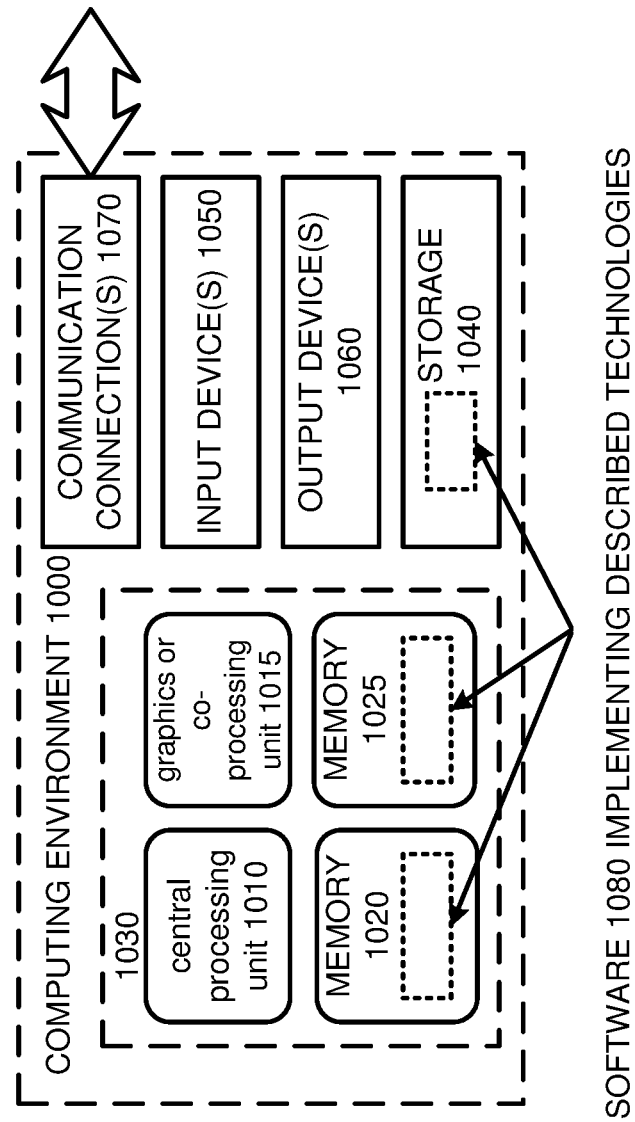
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s). For example, the computing environment 1000 can be used for the network monitoring service 410 (FIG. 4) and can execute the clustering algorithm and tracking.

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASIC s), Program-specific Standard Products (AS SPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of tracking clusters associated with events of network devices, the method comprising:
receiving alerts from multiple network devices in a network;
grouping a first subset of the multiple network devices using a clustering algorithm into a first group at a first point in time;
assigning an identifier to the first group;
assigning an anchor node to the first group, the anchor node being one of the multiple network devices in the first group;

at a second point in time, later than the first point in time, grouping a second subset of the multiple network devices using the clustering algorithm into a second group, wherein the first subset includes different network devices of the multiple network devices than the second subset;

determining that the second group includes the anchor node from the first group; and assigning the identifier, from the first group, to the second group using the determination that the anchor node is included in both the first and second groups.

2. The method of claim 1, wherein a number of network devices in the first group differs from a number of network devices in the second group.

3. The method of claim 1, further including merging the first group with a third group to form the second group, and, determining that the second group obtains the identifier associated with the first group instead of an identifier associated with the third group based on properties of the anchor node of the first group.

4. The method of claim 1, wherein assigning the anchor node further includes selecting one of the multiple network devices in the first group based on a frequency of alerts received from each of the multiple network devices.

5. The method of claim 1, further including tracking the identifier of the first group and how the first group changes over time in terms of which of the multiple network devices are included in the first group.

6. A method, comprising:

determining a first cluster of nodes from a plurality of nodes at a first point in time;

assigning an identifier to the first cluster of nodes;

determining a second cluster of nodes at a second point in time, wherein the second cluster of nodes differs from the first cluster of nodes;

determining that the second cluster is related to the first cluster, wherein the determining that the second cluster is related to the first cluster includes assigning an anchor node to one of the nodes in the first cluster and determining that the anchor node is within the second cluster; and based on the determining that the second cluster is related to the first cluster, assigning the identifier, which was previously assigned to the first cluster of nodes, to the second cluster to track how the first cluster changes over time.

7. The method of claim 6, wherein the anchor node is selected based on a frequency of events associated with the first cluster of nodes.

8. The method of claim 6, further including assigning an anchor node to the second cluster that differs from the anchor node in the first cluster.

9. The method of claim 6, wherein the determining of the first cluster of nodes includes detecting events from the plurality of nodes and using a clustering algorithm to determine the first cluster of nodes based on the detected events.

10. The method of claim 6, further including merging the first cluster with a third cluster to form the second cluster, and, determining that the second cluster obtains the identifier associated with the first cluster rather than an identifier associated with the third cluster based on properties of an anchor node of the first cluster.

11. The method of claim 10, wherein the properties of the anchor node include a duration of time that the anchor node has been assigned.

12. The method of claim 6, wherein the plurality of nodes are network devices in a network and the cluster determination is based on a frequency of incidents reported from the network devices.

13. The method of claim 6, wherein the identifier persists through multiple changes of which nodes are included in the first cluster.

14. A system, comprising:

a server computer including a processor configured to:

determine a first cluster of nodes based on events associated with the nodes, wherein the determined first cluster is associated with a first time;

assign an identifier to the first cluster to track the first cluster over time;

determine a second cluster of nodes at a second time, wherein the second cluster includes different nodes than the first cluster; and determine whether the second cluster is related to the first cluster by determining that the second cluster includes an anchor node that is also included in the first cluster of nodes, and, if so, assign the identifier to the second cluster to track the first cluster over time.

15. The system of claim 14, wherein the anchor node is a first anchor node and assigning a second anchor node in the second cluster to update the first anchor node.

16. The system of claim 14, wherein the first cluster of nodes are network switches and the events are alerts from the network switches.

17. The system of claim 14, wherein the first cluster of nodes are network switches with network links coupling the first cluster of nodes together.

18. The system of claim 14, wherein a number of nodes in the first cluster differ from a number of nodes in the second cluster.

19. One or more computer-readable media comprising computer-executable instructions that, when executed, cause a computing system to perform a method, comprising:

determining a first cluster of nodes from a plurality of nodes at a first point in time;

assigning an identifier to the first cluster of nodes;

determining a second cluster of nodes at a second point in time, wherein the second cluster of nodes differs from the first cluster of nodes;

determining that the second cluster is related to the first cluster by determining that the second cluster includes an anchor node that is also within the first cluster of nodes; and based on the determining that the second cluster is related to the first cluster, assigning the identifier, previously assigned to the first cluster of nodes, to the second cluster to track how the first cluster changes over time.

* * * * *